United States Patent Office 2,734,894
Patented Feb. 14, 1956

2,734,894

CURING 2,4-DIMETHYLSTYRENE POLYMERS WITH TERTIARY BUTYL PEROXIDES

Mervyn Francis Vaughan, Cheam, England, assignor to The Distillers Company Limited, Edinburgh, Scotland, a British company No Drawing. Application June 12, 1952,
Serial No. 293,205

Claims priority, application Great Britain July 3, 1951

13 Claims. (Cl. 260—93.5)

The present invention relates to a process for decreasing the solubility and fusibility of polymerisation products of 2:4-dimethylstyrene.

It is well known that the high molecular weight polymers of styrene and of alkylated or halogenated styrenes wherein the alkyl or halogen substituent is attached to the benzene ring, as normally produced by a thermal polymerisation in the presence or absence of a polymerisation activator or catalyst, are fusible at high temperatures and soluble in a range of solvents. While it has been claimed that it is possible to convert hydrocarbon polymers such as polyethylene into "cured" materials insoluble in the usual solvents by heating them in the presence of organic or inorganic peroxides, attempts to cure polystyrene by similar treatments fail. If polystyrene is heated with organic peroxides such as benzoyl peroxide, degradation of the polymer takes place with the production of low molecular weight materials of poor colour and mechanical properties. The same applies to the polymerisation products of 2:4-dimethylstyrene, which are not susceptible to curing by heat treatment alone or by heat treatment in the presence of organic peroxides such as benzoyl peroxide.

It has now been discovered that the polymerisation products of 2:4-dimethylstyrene may be converted by heat treatment in the presence of certain peroxidic compounds, as hereinafter defined, into a material which is insoluble in the usual solvents for poly-2:4-dimethylstyrene and which is infusible without decomposition; or, briefly stated, into a cured condition.

Accordingly, the present invention comprises the steps in a process for the curing of polymerisation products of 2:4-dimethylstyrene of incorporating in the monomer or polymer of 2:4-dimethylstyrene a peroxide compound of the formula $C(CH_3)_3$—O—O—R, wherein R is a monovalent radical, and thereafter heating the mixture at a temperature above about 40° C.

The peroxide compound employed may be any one of a very wide class of peroxides having a tertiary butyl radical on one end. Thus the monovalent radical at the opposite end (R in the above formula) may be a higher or lower alkyl, a hydroxy alkyl, an acyl, an aralkyl, a cycloalkyl or an alkenyl radical. Examples of these peroxide compounds which may be mentioned include t-butyl-methylperoxide, t-butyl ethylperoxide, t-butyl propylperoxide, di-tertiary butylperoxide, t-butyl peracetate, t-butyl perpropionate, t-butyl perstearate, t-butyl peradipate, t-butyl persuccinate, t-butyl percrotonate, t-butyl perundecenoate, t-butyl perbenzoate, t-butyl perphthalate, t-butyl allyperoxide, t-butyl crotylperoxide, t-butyl 1-hydroxy methylperoxide, t-butyl 1-hydroxy ethylperoxide, t-butyl pentamethyl ethylperoxide, t-butylethyl benzylperoxide, t-butyl alphahydroxy benzylperoxide, t-butyl perchlorobenzoate, t-butyl peranisoate, t-butyl perdinitrobenzoate and t-butyl 1-methyl cyclohexylperoxide. Examples of peroxide compounds which it is preferred to employ include di-tertiary butyl-peroxide, t-butyl perbenzoate, t-butyl peracetate, t-butyl peranisoate, and t-butyl perchlorobenzoate.

The process of the present invention is unexpectedly specific. Polystyrene itself canot be cured by heat treatment in the presence of the peroxides of the formula $C(CH_3)_3$—O—O—R defined above. On the other hand, neither can poly-2:4-dimethylstyrene be cured by heat treatment with peroxides such as benzoyl peroxide, lauroyl peroxide and diacyl peroxides generally. It is therefore most surprising that the curing of poly-2:4-dimethylstyrene by the peroxides as defined above should take place.

The peroxide compound may be incorporated either in the monomer of 2:4-dimethylstyrene before polymerisation, or with the polymerised products of 2:4-dimethylstyrene. The amount of peroxide compound which may be used may vary within wide limits, and the preferred amount for any particular application will depend on the nature of the polymer, the peroxide compound, the severity of the heat treatment and the extent of curing which is desired. It has been found suitable to use amounts of the peroxide compound in the range 0.1% to 10% and preferably from 0.1% to 5% by weight on the weight of the 2:4-dimethylstyrene taken. The temperature and time required for the heating step of the curing process varies similarly on the nature and amount of peroxide compound used, on the nature of the polymeric product and, where the peroxide compound has been incorporated with the monomer of 2:4-dimethylstyrene, on the temperature and time of heating used in the polymerisation step. Temperatures in the range 75° C. to 200° C. may be employed, and it is preferred to use temperatures of the order of about 120° C. to 180° C. When using the lower temperatures, such as 100° C., the time required for curing of the polymer may be several days, whilst when employing higher temperatures, such as 180° C., the curing may be complete in a matter of minutes. Where the peroxide compound has been incorporated with the monomer of 2:4-dimethylstyrene, the poly-2:4dimethystyrene may be partially or completely cured simultaneously with its formation in the polymerisation step. This is exemplified in Examples 11, 12 and 13.

The curing process may be carried out at any pressure atmospheric pressure being normally suitable for this purpose.

Without being bound to any particular theory, it is believed that the curing reaction is due to the linking together of the polymeric chain molecules in the initial polymer with the formation of large molecular aggregates which finally become insoluble in the usual solvents for the polymer. An increase in molecular weight on heating the poly-2:4-dimethylstyrene with a peroxide compound as defined is thus a sign that the process of curing is proceeding.

The manner in which the peroxide compound is incorporated in the 2:4-dimethylstyrene is non-critical and may be effected in any suitable way. Thus the polymer may be dissolved in an organic solvent, for example benzene, toluene, xylene and chloroform, and the peroxide compound added to the solution to form a homogeneous mixture, the organic solvent then being removed by evaporation. The polymer may also be dissolved in the monomer of 2:4-dimethylstyrene and the peroxide compound added to form a homogeneous mixture, which is then heated to form the cured compound. Alternatively, the peroxide compound may be mechanically mixed with the polymerisation product in a finely divided condition, thereby obtaining a dry mixture of the two components. Other methods obvious to those skilled in the art, such as immersing the polymerisation products in a solution of the peroxide compound in an organic solvent having a solvent or swelling action on said polymerisation products, may also be employed.

The polymerisation products of 2:4-dimethylstyrene treated according to the present invention may contain other polymerisable compounds or other materials such as plasticisers, fillers, lubricants, pigments, dyes, and the like, commonly used in the art.

The products of the present invention are of use in the production of mouldings, in coating compositions which after application can be cured to a heat- and solvent-resistant state, and in the formation of ion-exchange resins. A particular application is in the manufacture of laminated compositions, the laminae, for example glass-cloth, being impregnated with a solution of a soluble polymer of 2:4-dimethylstyrene, suitably in the monomer containing the peroxide compound, and then heated to give insoluble thermostable structures, which may be used for example in the construction of radomes.

A convenient index of average molecular weight is the easily measurable quantity "intrinsic viscosity," denoted by the symbol $(\eta)$, referred to in the article in the Journal of Physical Chemistry 1935, volume 39, page 153, which is derivable from the equation:

$$(\eta) = Lt\ C \rightarrow 0 \left(\frac{\eta r - 1}{C}\right)$$

where $\eta r$ is the viscosity, at 25° C. of a solution of C grams of polymer in 100 ml. of benzene relative to the viscosity of benzene. It will be seen therefore that the "intrinsic viscosity" is the limiting value of the fraction "relative viscosity minus one divided by the concentration" when the concentration equals zero.

The following examples are given to illustrate the process of the present invention. The percentages quoted are by weight unless otherwise indicated.

EXAMPLES 1–7

Seven batches of polymers of 2:4-dimethylstyrene were dissolved in benzene and to the solution an amount of tertiary-butylperbenzoate corresponding to the percent of the polymer indicated in column 1 of the table was added. The solvent was removed from the solution and the resulting material comminuted and then heated under the conditions described below. Solely by way of comparison a batch of 2:4-dimethylstyrene polymer not admixed with any catalyst was also treated under the conditions described below.

The batches of polymers were heated in vacuo for the time given in column 2, at the temperature given in column 3 of the table below. The intrinsic viscosity of the polymer before treatment is given in column 4 and the intrinsic viscosity of the polymer after heat treatment is given in column 5 of the table below:

Table

| | Column 1 | Column 2 | Column 3 | Column 4 | Column 5 |
|---|---|---|---|---|---|
| | Percent catalyst | Time | Temperature, ° C. | Intrinsic viscosity (ante) | Intrinsic viscosity (post) |
| Example: | | | | | |
| 1 | 0.9 | 1 day | 90 | 15.6 | 18.5. |
| 2 | 0.9 | 2 days | 90 | 15.6 | 20.8. |
| 3 | 0.9 | 6 days | 90 | 15.6 | insoluble. |
| 4 | 0.15 | 5 mins | 180 | 9.5 | 15.7. |
| 5 | 0.36 | do | 180 | 13.5 | insoluble. |
| 6 | 0.9 | do | 180 | 11.1 | Do. |
| 7 | 1.8 | 2 mins | 180 | 13.65 | Do. |
| Comparison | nil | 1 day | 90 | 10.3 | 10.1. |

It is clear from the results quoted above that poly-2:4-dimethylstyrene undergoes a very slow fall in molecular weight on heating alone. Examples 1–3 show the progress of the curing reaction; the polymer first increases in intrinsic viscosity, i. e. in molecular weight, and later becomes insoluble. Examples 4–7 show that the curing process becomes increasingly rapid as the amount of t-butyl perbenzoate is increased.

EXAMPLE 8

A batch of a polymer of 2:4-dimethylstyrene was dissolved in benzene and mixed with an amount of di-tertiary butylperoxide corresponding to 0.9% of the polymer. The solvent was then removed from the solution and the resulting material heated in air at 180° C. for 5 minutes. The intrinsic viscosity of the polymer before this heat treatment was 17.2. After this heat treatment the polymer was insoluble.

For comparison, a batch of a poly-2:4-dimethylstyrene containing 1.5% on polymer of caprylyl peroxide, was prepared and heated in exactly the same way. The product was still soluble. The intrinsic viscosity in this case fell from 13.3 to 10.9, showing that degradation of the polymer rather than a curing reaction had occurred.

EXAMPLE 9

A batch of poly-2:4-dimethylstyrene was incorporated with 0.9% of its weight of di-t-butyl peroxide by the method given in Example 8. For the purposes of comparison a batch of polystyrene containing 2.4% of di-t-butyl peroxide was also prepared. These two batches were heated at 180° C. in air. After five minutes heating, the poly-2:4-dimethylstyrene had become insoluble in benzene. The polystyrene after the same time of heating, showed little change, but after continuing the heat treatment for six hours, it was found that its intrinsic viscosity, i. e. molecular weight, had been reduced to less than half its original value. This example shows that di-t-butyl peroxide has a curing effect upon poly-2:4-dimethylstyrene but a degrading effect upon polystyrene.

EXAMPLE 10

An amount of tertiary butyl perbenzoate corresponding to 10% of the polymer was mixed by means of a glass rod with a batch of precipitated powder polymer of 2:4-dimethylstyrene. The resulting material was heated in nitrogen at 180° C. for 5 minutes. The intrinsic viscosity before this heat treatment was 14.3. After this heat treatment the polymer was insoluble.

EXAMPLE 11

A batch of the monomer of 2:4-dimethylstyrene was mixed with an amount of tertiary butyl peranisoate corresponding to 2% of the monomer. After heating for 23 hours at 125° C., the resulting polymer had an intrinsic viscosity of 7.46. This polymer was heated at 200° C. for 5 minutes. After this heat treatment the polymer was insoluble.

EXAMPLE 12

A batch of the monomer 2:4-dimethylstyrene was mixed with an amount of di-tertiary butylperoxide corresponding to 1% of the monomer. After heating for 2½ hours at 125° C., the resulting polymer had an intrinsic viscosity of 17.65. This polymer was further heated at 180° C. for 5 minutes. After this heat treatment the polymer was insoluble.

By way of comparison a sample of the monomer of 2:4-di-methylstyrene was heated for 15 hours at 125° C. in the absence of catalyst. At the end of this treatment 98% of the monomer had been polymerised, the intrinsic viscosity of the polymer being 7.2.

EXAMPLE 13

A batch of the monomer of 2:4-dimethylstyrene was mixed with an amount of di-tertiary butylperoxide corresponding to 1% of the monomer. The mixture was heated for 1 hour at 155° C. After this heat treatment the di-methylstyrene was fully polymerised, and was completely insoluble.

EXAMPLE 14

Three batches of a polymer of 2:4-dimethylstyrene are dissolved in benzene and mixed with amounts of t-butyl perpropionate, t-butyl perstearate and t-butyl persuccinate respectively, corresponding to 1% of the polymer. The solvent is then removed from the solutions and the resulting materials heated in air at 180° C. for 5 minutes. After this heat treatment the polymers are insoluble.

EXAMPLE 15

A batch of poly-2:4-dimethylstyrene is incorporated with 2% of its weight of t-butyl percrotonate by the method given in Example 12. After removal of the solvent the resulting material is heated in air at 180° C. for 5 minutes. After this heat treatment the polymer becomes insoluble in benzene.

EXAMPLE 16

A batch of poly-2:4-dimethylstyrene is dissolved in benzene and mixed with 1% of its weight of t-butyl allylperoxide. The solvent is removed from the solution and the resulting material heated in air for 5 minutes at 180° C. As a result of this heat treatment the polymer becomes insoluble in benzene.

EXAMPLE 17

An amount of t-butyl alpha-hydroxy benzylperoxide corresponding to 1% by weight of the polymer is mixed by means of a glass rod with a batch of precipitated polymer powder of 2:4-dimethylstyrene. The resulting material is heated in air at 180° C. for 5 minutes, when it becomes insoluble in benzene.

EXAMPLE 18

Two batches of a polymer of 2:4-dimethylstyrene are dissolved in benzene and mixed with amounts of t-butyl 1-hydroxy ethylperoxide and t-butyl penta-methyl ethylperoxide respectively, corresponding to 1% of the polymer. The solvent is removed from the solutions and the resulting materials heated in air at 180° C. for 5 minutes. After this heat treatment the polymers are insoluble.

EXAMPLE 19

An amount of t-butyl 1-methylcyclohexylperoxide corresponding to 1% by weight of the polymer is mixed with a solution of poly-2:4-dimethylstyrene in benzene. After removal of the solvent the resulting material is heated in air at 180° C. for 5 minutes. After this heat treatment the polymer is insoluble in benzene.

EXAMPLE 20

A 10% solution of poly-2:4-dimethylstyrene in 2:4-dimethylstyrene is made up and mixed with an amount of di-tertiary butylperoxide corresponding to 1% of the weight of polymer and monomer combined. A strip of glass cloth is impregnated with the solution and suspended in an oven at 150° C. for 2 hours, to produce a rigid thermostable lamina.

I claim:
1. A process for the curing of polymerisation products of 2:4-dimethylstyrene, which comprises incorporating in a polymer of 2:4-dimethylstyrene, 0.1 to 5% by weight, on the weight of the polymer, of a peroxide compound of the formula $C(CH_3)_3-O-O-R$, wherein R is selected from the group consisting of alkyl, hydroxy-alkyl, acyl, aralkyl, cyclo-alkyl and alkenyl radicals, and thereafter heating the mixture at a temperature in the range of from 120° to 180° C. until an insoluble and infusible 2:4-dimethylstyrene polymer is obtained.

2. A process as in claim 1, wherein the peroxide compound is di-tertiary butyl peroxide.

3. A process as in claim 1, wherein the peroxide compound is tertiary butyl peracetate.

4. A process as in claim 1, wherein the peroxide compound is tertiary butyl perbenzoate.

5. A process as in claim 1, wherein the peroxide compound is tertiary butyl peranisoate.

6. A process as in claim 1, wherein the peroxide compound is tertiary butyl perchlorobenzoate.

7. A composition of matter comprising a polymer of 2:4-dimethylstyrene, which has been cured by the incorporation of a peroxide compound of the formula $C(CH_3)_3-O-O-R$, wherein R is selected from the group consisting of alkyl, acyl, unsaturated acyl, aralkyl, aroyl, cyclo-alkyl and alkenyl radicals, in an amount between 0.1% and 5% of the weight of the polymer, the composition being heated at a temperature in the range of from 120° to 180° C. until an insoluble and infusible 2:4-dimethylstyrene polymer is obtained.

8. A composition of matter as in claim 7, wherein the peroxide compound is di-tertiary butyl peroxide.

9. A composition of matter as in claim 7, wherein the peroxide compound is tertiary butyl peracetate.

10. A composition of matter as in claim 7, wherein the peroxide compound is tertiary butyl perbenzoate.

11. A composition of matter as in claim 7, wherein the peroxide compound is tertiary butyl peranisoate.

12. A composition of matter as in claim 7, wherein the peroxide compound is tertiary butyl perchlorobenzoate.

13. A process according to claim 1, and recovering the resultant insoluble and infusible polymer.

References Cited in the file of this patent

UNITED STATES PATENTS

| | | |
|---|---|---|
| 2,555,298 | Sturrock | May 29, 1951 |
| 2,600,783 | Kropa | June 17, 1952 |
| 2,647,111 | Shusman | July 28, 1953 |